United States Patent [19]

Hetmann

[11] 3,904,300

[45] Sept. 9, 1975

[54] ELASTIC JOINT AND METHOD OF ASSEMBLY FOR INTERCONNECTING STEERING LINKAGES, ESPECIALLY OF MOTOR VEHICLES

[75] Inventor: Richard Hetmann, Tamm, Germany

[73] Assignee: Firma Dr. -Ing. H.c.F. Porsche K.G., Germany

[22] Filed: Mar. 29, 1973

[21] Appl. No.: 346,062

[30] Foreign Application Priority Data
Mar. 29, 1972 Germany............................ 2215330

[52] U.S. Cl................. 403/203; 29/451; 267/63 R; 403/224; 403/225; 403/132
[51] Int. Cl.²........................................... F16F 1/38
[58] Field of Search......... 280/95 R, 95 A; 403/203, 403/224, 225, 226, 228, 291; 248/15, 21, 22, 358 R; 267/57.1, 63 A, 63 R; 29/451

[56] References Cited
UNITED STATES PATENTS

| | | | |
|---|---|---|---|
| 2,607,617 | 8/1952 | Pringle | 403/203 |
| 2,958,526 | 11/1960 | Ulderup et al. | 267/63 R |
| 3,082,999 | 3/1963 | Wolf et al. | 267/63 R |
| 3,147,964 | 9/1964 | Wolf | 267/63 R |
| 3,508,745 | 4/1970 | Deane | 267/63 R |

FOREIGN PATENTS OR APPLICATIONS
1,008,129  9/1957  Germany

*Primary Examiner*—Werner H. Schroeder
*Assistant Examiner*—Conrad L. Berman
*Attorney, Agent, or Firm*—Craig & Antonelli

[57] ABSTRACT

An elastic joint for interconnecting steering linkage sections on a steering linkage installation for motor vehicles and the like. A metallic sleeve rotatably accommodating a hinge bolt attached to one of the linkage sections is fixedly secured inside of a bore through an elastic bushing. The elastic bushing is inserted into a joint eye opening under prestress so as to resiliently maintain the metallic sleeve in position in the joint eye. One or the other of the interior of the joint eye opening and the exterior of the elastic bushing is configured such that, when assembled, the bushing exhibits different rigidity in different radial directions of movement of the metallic sleeve such that a relatively rigid connection between the joint eye and the sleeve exists for radial movement of the sleeve corresponding to steering force transmission while relatively resilient radial movement of the steering sleeve is obtained for transmission of shock forces from the vehicle wheels back through the joint.

22 Claims, 5 Drawing Figures

ELASTIC JOINT AND METHOD OF ASSEMBLY FOR INTERCONNECTING STEERING LINKAGES, ESPECIALLY OF MOTOR VEHICLES

BACKGROUND AND SUMMARY OF THE INVENTION

This invention relates to an elastic joint, especially for use with steering linkages of motor vehicles. It is particularly related to linkages wherein one linkage section engages, by way of a cylindrical hinge bolt or knuckle pin forming the joint axle, in a joint eye or lug, lined with an elastic bushing provided at another linkage section. The elastic bushing is inserted under tension in a joint eye recess of the other linkage section, which recess is inwardly narrowed in a spherical or double-cone-shaped manner with the edges of this elastic bushing exhibiting overlapping lips to hold the same in place in the joint eye recess.

In rapid, higher-power automotive vehicles, it is necessary and desirable to provide a maximally direct steerage with exact transmission of the steering wheel movements to the steered wheels in order to permit the driver a firm control over the vehicle even in case of high driving speeds. On the other hand, it is also desirable to keep the steering as free as possible from reactive forces of the wheels caused by unevennesses of the road surface or the like, so that, although there is a direct connection between the steering wheel and the steered wheels with regard to the transmission of steering forces, the reactive forces of the wheels oriented at right angles to the direction of the steering force within the steering linkage train are substantially damped or attenuated. This is of special importance for reducing the wear and tear on the steering assembly and for the driving safety of the vehicle in steering mechanisms which have no damping means in the steering gear, especially in case of rack-and-pinion steering mechanisms.

Elastic joints for steering linkages of automotive vehicles of various designs have been contemplated. The simplest design provides a joint eye recess of a circular outline in the linkage section, which recess is inwardly narrowed in a spherical or double-cone-shaped manner. An elastic bushing is inserted in this joint eye recess at a suitable pretensioning or precompression. The elastic bushing is adapted in its outer circumference to the narrowing of the joint eye recess and is inserted in the joint eye recess with such an amount of pretensioning that it is sufficiently secured, by a frictional connection, against sliding with respect to the hinge bolt of the one linkage section, as well as with respect to the joint eye recess in the other linkage section. In this just-described design, the elastic bushing is under a radial compressive stress on all sides, which imparts to the joint a sufficient radial rigidity for keeping the vehicle well on its track, but does not permit an absorption of undesired reactive forces of the wheels, due to the uniformity of its radial compressive stress toward all sides (DAS German Published Application No. 1,008,129).

Furthermore, an elastic joint intended for damping the vibrations in the steering linkage caused by reactive forces of the wheels has been known from DAS No. 1,134,901, wherein an interspace sufficient for a proper angular movability of the hinge pin with respect to the joint eye has been provided between a hinge pin of one linkage section and an elastic intermediate connecting member inserted in a joint eye recess of the other linkage section. The elastic intermediate member is clamped at right angles to the direction of the steering forces to be transmitted between two shell elements connected with the hinge pin, in such a manner that the steering forces can be transmitted exclusively via the elastic intermediate manner to the hinge pin. Such a construction of the joint makes it possible to keep reactive forces of the wheels caused by road unevennesses substantially away from the steering linkage by means of the elastic intermediate member but, conversely, a damping of the steering forces must also be tolerated, so that the steering becomes unduly labile, and the driver loses the feeling of security due to the softness of the steering.

Furthermore, joint connections for linkage sections of steering linkages for automobiles have been contemplated which are constructed in the manner of rubber-metal elements (for example, German Pat. No. 1,047,036) wherein an elastic sleeve surrounding the bearing for the hinge bolt and/or a spherical head is inserted in a metallic sleeve forming a joint eye recess, and the hinge bolt is received with a radial play in a cylindrical bearing bushing. Even by means of such a complicated construction of the joint, it is impossible to effect, on the one hand, an exact transmission of the steering forces to the wheels and, on the other hand, a sufficient damping of the reactive forces of the wheels caused by the road unevennesses.

The present invention is based on the problem of constructing an elastic joint of the type described above, intended for steering linkages of motor vehicles, with a minimum of manufacturing expenditure, in such a manner that a direct transmission of steering forces is ensured between two linkage sections, but simultaneously a maximally extensive damping is achieved of the vibrations caused by reactive forces of the wheels.

These problems are solved, according to the present invention, by providing that the elastic bushing is inserted in the plane of the joint eye with differently large pretensioning in two mutually perpendicularly oriented directions in the joint eye recess of the other linkage section. The present invention also contemplates that the bearing bore for the hinge bolt of one linkage section is formed by a cylindrical metallic sleeve inserted in the elastic bushing. In the direction of the intended steering force transmission between both linkage sections, the elastic bushing is inserted with a great amount of prestressing and, at right angles to the steering force direction, the bushing is inserted with a lesser amount of prestressing in the joint eye recess of the other linkage section.

According to a preferred embodiment of the invention, the provision is made, in detail, that the elastic bushing has a cylindrical outer peripheral surface and is inserted in a joint eye recess of the other linkage section having an oval outline, wherein the diameter of the unstressed elastic bushing is at least as great as the maximum inside diameter of the joint eye recess in the other linkage section, so that the radial rigidity of the elastic bushing in one radial direction with respect to the hinge bolt axis is larger than in other radial directions. The metallic sleeve for encompassing or surrounding the hinge bolt is dimensioned so that it projects beyond both flat sides of the elastic bushing, the end faces thereof forming tension planes.

However, the invention can also be realized in another preferred embodiment as an elastic bushing, the outer periphery of which has an oval outline, which is inserted in a joint eye recess having a circular outline.

In both of the above-mentioned preferred embodiments, a resilient characteristic of the elastic sleeve is obtained which varies over the circumference of the joint eye, as a consequence of the pretensioning of the elastic sleeve which is larger in one direction and smaller in the other direction. This different pretensioning makes it possible to transmit, in the direction of the large pretensioning of the sleeve, also high steering forces directly, i.e. without the damping effect of the elastic sleeve, whereas, in the direction of the lesser pretensioning of the elastic sleeve, reactive forces of the wheels oriented in this direction are absorbed relatively softly and thus extensively free the steering of undesired vibrations. The elastic joint of the present invention can, moreover, be produced with a minimum expenditure corresponding to the expenditure required for conventional single elastic joints, and is particularly suitable for improving the driving characteristics and driving convenience and comfort of automotive vehicles equipped with rack-andpinion steering mechanisms.

The above-mentioned and further objects, features and advantages of the present invention will become more apparent from the following description when taken in conjunction with the accompanying drawings, which show, for purposes of illustration only, one embodiment in accordance with the present invention.

DETAILED DESCRIPTION OF THE DRAWINGS

Figure 1:
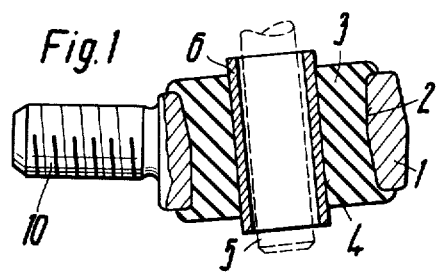
FIG. 1 shows a longitudinal sectional view of a joint eye installation constructed according to the invention.
Figure 4:
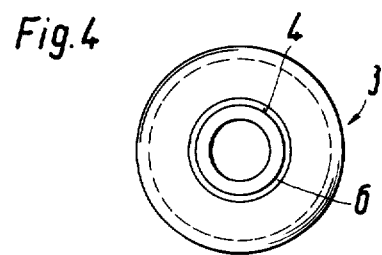
FIG. 4 is a plan view of an elastic bushing arrangement according to FIG. 3.

The elastic joint installation illustrated in the drawing includes a joint eye 1 with a joint eye recess 2 inwardly narrowed in a spherical and/or double-cone-shaped manner for accommodating elastic bushing 3. Elastic bushing 3 is constructed of rubber or synthetic resinous elastic material while joint eye 1 is relatively rigid. A metallic sleeve 6 is inserted in bore 4 of elastic bushing 3 for engaging hinge bolt or knuckle pin 5 (shown in dash lines in FIG. 1). The joint eye recess 2 has an oval outline, as can be seen particularly from FIG. 2, while the elastic bushing 3 has a circular outline prior to assembly, as can be seen particularly from FIG. 4. The elastic bushing 3 furthermore has a cylindrical outer periphery and is provided, in the zone of its two flat sides 8 and 9, with radially projecting lips 7 which, when the bushing 3 is mounted, overlap the edges of the joint recess 2. The metallic sleeve 6 forming the bearing bore for the hinge bolt 5 is joined to the elastic bushing 3 by means of vulcanizing and extends beyond the two flat sides 8 and 9 thereof by respectively a certain amount. A threaded pin 10 is connected to the joint eye 1, by way of which the joint eye 1 can be connected to a tie bar or the like.

The mode of operation of the just-described elastic joint installation of this invention is as follows:

The originally cylindrical elastic bushing 3 exhibits, after being pressed into the joint eye recess 2 of oval outline, differently large radial pretensioning in two mutually perpendicular directions and thus also has differently large radial rigidity, wherein the direction of the greatest radial pretensioning is aligned to the direction of the steering force transmission. Due to the great radial pretensioning of the elastic bushing 3 in this direction, steering forces are thus transmitted practically in an entirely rigid manner, whereas disturbing forces oriented at an angle or at right angles to this direction and caused by reactive forces of the wheels are increasingly strongly damped, due to the radial pretensioning of the elastic bushing which is smaller, or small, in these directions. Therefore, the elastic joint of the present invention makes it possible to transmit steering forces oriented in a specific direction in a non-resilient, rigid manner, and thus to avoid any lability or softness of the steering, but, on the other hand, keeps disturbing forces produced by reactive forces on the wheels away from the steering mechanism.

Figure 2:
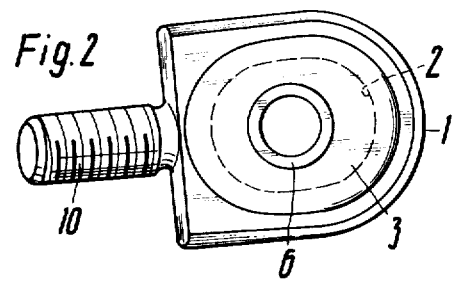
FIG. 2 is a plan view of a joint eye installation according to FIG. 1.
Figure 3:
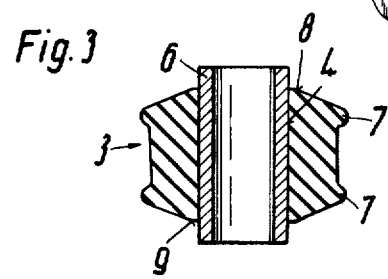
FIG. 3 is a section through an elastic bushing arrangement for a joint eye installation according to FIG. 1 prior to assembly.

As viewed in FIG. 2, the relative radial movement of the sleeve 6 and boss or joint eye 1 in a direction of the minor axis of the oval shaped recess 2 would correspond to relative radial movement during the transmission of steering forces between the respective linkage sections. Since the elastic bushing 3 is maximally stressed along this minor axis, a relatively rigid steering force transmission is effected. Relative radial movement of the sleeve 6 and joint eye 1 in a direction of the major axis of the oval shaped recess corresponds to relative radial movement during the transmission of shock forces acting on the steered wheels in a direction transverse to the direction of steering forces on the sleeve. Since the elastic bushing 3 is minimally stressed along this major axis, a relatively resilient absorption of these shock forces by the bushing 3 is obtained.

Figure 5:
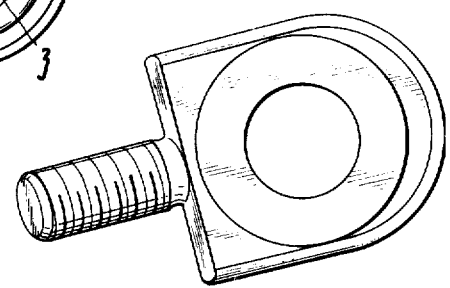
FIG. 5 is a plan view illustrating a modification of applicant's invention as shown in FIG. 2.

In another preferred embodiment, FIG. 5, the elastic bushing is of oval shape in the unstressed condition and the recess in the joint eye is circular.

The elastic bushing 3 may exhibit a diameter in the unstressed condition which is greater or possibly slightly less than the maximum inside diameter of the recess 2, it being necessary that the bushing 3 is stressed a different amount along the respective major and minor axes when assembled in the recess 2.

While I have shown and described only several embodiments in accordance with the present invention, it is understood that the same is not limited thereto but also contemplates numerous changes and modifications as would be known to those skilled in the art given the present disclosure of the invention, and I therefore do not wish to be limited to the details shown and described herein only schematically but intend to cover all such changes and modifications.

I claim:

1. An elastic joint installation for joining a first linkage section to a second linkage section; said installation comprising:

bushing sleeve means having an axially extending central opening for accommodating a hinge bolt of said first linkage section, joint eye means having an axially extending joint eye opening which surrounds said sleeve means, said opening having a first surface defining an outline of a first given shape which is continuous along substantially the entire extent of the opening, means for connecting said joint eye means to said second linkage section, and pretensioned elastic bushing means having a second surface defining an outline of a second given shape different from said first given shape in the unpretensioned condition of the elastic bushing means, said elastic bushing means being interposed in said joint eye opening in surrounding relationship with said sleeve means, being engaged with said sleeve means and being retained and engaged by said joint eye means such that movement of said sleeve means in radial directions with respect to a hinge bolt axis through said central opening is resiliently resisted by said elastic bushing means, wherein the surface of said joint eye opening surrounds the surface of said elastic bushing means to exhibit different resilience in different radial directions of movement of said sleeve means, such that a direct transmission of forces at opposite points of contact between said elastic bushing means and said joint eye opening through said elastic joint installation is ensured in a first radial direction while a simultaneous substantially extensive damping of forces through said elastic joint installation is achieved in a second radial direction, and wherein the joint eye opening and the bushing means are engaged such that the first and second surfaces define outlines having a similar shape.

2. An installation according to claim 1, wherein said joint eye opening has an oval outline, wherein said elastic bushing means is of cylindrical shape in the unstressed condition, and wherein the diameter of the elastic bushing means in the unstressed condition is at least as great as the maximum inside diameter of the joint eye opening.

3. An installation according to claim 1, wherein the elastic bushing means has an approximately oval outline in the unstressed condition, wherein said joint eye opening has a circular outline, and wherein the diameter of said joint eye opening is at least as small as the minimum diameter of said elastic bushing means.

4. An installation according to claim 1, wherein the bushing means surface engages said joint eye opening surface along the entire axial extent of the opening.

5. An installation according to claim 1, wherein the joint eye opening surface engages said elastic bushing means surface continuously along the bushing means outline.

6. An installation according to claim 1, wherein the bushing means is a unitary element.

7. An installation according to claim 1, wherein said elastic bushing means includes overlapping lip means engageable with portions of said joint eye means to hold said elastic bushing means in place in said joint eye means.

8. An installation according to claim 7, wherein said sleeve means is formed as a cylindrical metallic sleeve.

9. An installation according to claim 8, wherein said metallic sleeve projects axially beyond oppositely facing flat end portions of said elastic bushing means.

10. An installation according to claim 1, wherein said elastic bushing means is inserted into said joint eye opening under pretensioning, and wherein the pretensioning of said elastic bushing means is different for different radial directions thereby resulting in said different resilience characteristics.

11. An installation according to claim 10, wherein said first and second linkage form part of a vehicle steering linkage arrangement, and wherein said elastic bushing means is pretensioned a greater amount in one of radial directions corresponding to steering force transmission through said first and said linkages and radial directions at right angles to said radial directions corresponding to steering force transmission.

12. An installation according to claim 11, wherein said elastic bushing means includes overlapping lip means engageable with portions of said joint eye means to hold said elastic bushing means in place in said joint eye means.

13. An installation according to claim 11, wherein said joint eye opening has an oval outline, wherein said elastic bushing means is of cylindrical shape in the unstressed condition, and wherein the diameter of the elastic bushing means in the unstressed condition is at least as great as the maximum inside diameter of the joint eye opening.

14. An installation according to claim 11, wherein the elastic bushing means has an approximately oval outline in the unstressed condition, wherein said joint eye opening has a circular outline, and wherein the diameter of said joint eye opening is at least as small as the minimum diameter of said elastic bushing means.

15. An installation according to claim 1, wherein the elastic bushing means extends axially within said joint eye opening, and wherein the shape of the bushing means outline is continuous along a major portion of the axial extent thereof.

16. An installation according to claim 15, wherein the bushing means surface engages said joint eye opening surface along the entire axial extent of the opening.

17. An installation according to claim 15, wherein said joint eye opening is inwardly narrowed in a double-cone-shaped manner.

18. An elastic joint installation for joining a first linkage section to a second linkage section; said installation comprising:

bushing sleeve means having an axially extending central opening accommodating a hinge bolt of said first linkage section, wherein said first outline is axially continuous in the area of connection between the pin means and the joint eye means, and wherein said joint eye opening and said bushing means are engaged such that the first and second surfaces define outlines having a similar shape.

19. An installation according to claim 18, wherein the bushing means is a unitary element.

20. An installation according to claim 18, wherein the bushing means outline completely engages the joint eye opening outline.

21. A method of making an elastic joint installation for joining first and second linkage sections to one another comprising:

selecting a cylindrical bushing sleeve having an axially extending central opening for accommodating a hinge bolt of said first linkage section, selecting a joint eye having an axially extending joint eye opening, said opening having a first surface defining an outline of a first given shape, which shape is substantially the same throughout the axial extent of the eye, positioning an elastic bushing in surrounding engagement with said sleeve and attaching said bushing to said sleeve, said bushing having a second surface defining an outline of a second given shape different from said first given shape, and inserting said elastic bushing under pretensioning into said joint eye opening in such a manner that the resilience of said elastic bushing is different in respective different radial directions at opposite points of contact between said elastic bushing and said joint eye opening with respect to a hinge bolt axis through the central opening in said sleeve, and the first and second surfaces are retainingly engaged such that the first and second shapes are similar.

22. A method according to claim 21, further comprising attaching said joint installation in a vehicle steering linkage arrangement such that said elastic bushing is pretensioned a greater amount in one of radial directions corresponding to steering force transmission through said first and second linkage and radial directions at right angles to said steering force transmission radial directions.

* * * * *